United States Patent
Tessler et al.

(10) Patent No.: US 11,758,380 B2
(45) Date of Patent: Sep. 12, 2023

(54) METHODS AND SYSTEMS FOR PRESENTING USER SPECIFIC INFORMATION BASED ON MOBILE DEVICE PROXIMITY TO SHORT-RANGE WIRELESS TECHNOLOGY BEACONS

(71) Applicant: Capital One Services, LLC, McLean, VA (US)

(72) Inventors: Leeyat Bracha Tessler, McLean, VA (US); Ray Cheng, McLean, VA (US); Imren Johar, McLean, VA (US); Daniel John Marsch, McLean, VA (US); Rocky Guo, McLean, VA (US); Bryant Yee, McLean, VA (US); John Jones, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/532,639

(22) Filed: Nov. 22, 2021

(65) Prior Publication Data
US 2023/0164530 A1    May 25, 2023

(51) Int. Cl.
*H04W 4/80* (2018.01)
*G06F 3/14* (2006.01)
*H04W 4/02* (2018.01)

(52) U.S. Cl.
CPC .............. *H04W 4/80* (2018.02); *G06F 3/14* (2013.01); *H04W 4/023* (2013.01)

(58) Field of Classification Search
CPC .......... H04W 4/021; H04W 4/22; H04W 4/23
See application file for complete search history.

(56) References Cited

U.S. PATENT DOCUMENTS

| | | | |
|---|---|---|---|
| 8,712,690 B1* | 4/2014 | White | G01S 5/02523 701/445 |
| 10,225,718 B2 | 3/2019 | Kim et al. | |
| 2015/0080021 A1* | 3/2015 | Bietz | H04B 1/3877 455/575.8 |
| 2015/0112748 A1* | 4/2015 | Kaye | H04W 4/02 705/7.19 |
| 2015/0139213 A1* | 5/2015 | Abraham | H04W 8/005 370/338 |
| 2015/0294084 A1* | 10/2015 | McCauley | G06Q 10/10 705/2 |
| 2015/0339091 A1* | 11/2015 | Yamaguchi | G06F 3/147 345/2.1 |

(Continued)

OTHER PUBLICATIONS

International Search Report and Written Opinion issued in corresponding International Application No. PCT/US2022/079397 dated Mar. 2, 2023 (10 pages).

*Primary Examiner* — Wen W Huang
(74) *Attorney, Agent, or Firm* — Perkins Coie LLP

(57) ABSTRACT

Methods and systems are disclosed for presenting user specific information based on mobile device proximity to short-range wireless technology beacons. For example, by determining the proximity of a mobile device to a short-range wireless technology beacon, user specific information may be displayed on a user interface such that a user may have easy access to user specific information without the need to rely on their mobile device for such access, thereby conserving mobile device battery life and improving the experience of the user.

20 Claims, 5 Drawing Sheets

(56) References Cited

U.S. PATENT DOCUMENTS

| | | | | |
|---|---|---|---|---|
| 2016/0007184 A1* | 1/2016 | Kulikov | .............. | G01S 5/0284 |
| | | | | 455/41.2 |
| 2016/0066212 A1* | 3/2016 | Visweswara | .......... | H04W 48/00 |
| | | | | 370/474 |
| 2016/0086228 A1* | 3/2016 | Babb | ................. | G06Q 30/0243 |
| | | | | 705/14.64 |
| 2017/0351470 A1* | 12/2017 | Beaven | ................ | H04W 4/023 |
| 2018/0317048 A1 | 11/2018 | Park et al. | | |
| 2018/0374127 A1* | 12/2018 | Walden | ............. | G06Q 30/0242 |
| 2020/0005279 A1* | 1/2020 | Raquepaw | ......... | G06Q 20/3821 |
| 2020/0150213 A1 | 5/2020 | Oh et al. | | |
| 2020/0259886 A1 | 8/2020 | Brune et al. | | |
| 2020/0320592 A1 | 10/2020 | Soule et al. | | |
| 2020/0351610 A1* | 11/2020 | Zehler | .................. | H04W 4/021 |
| 2020/0379946 A1* | 12/2020 | Coffman | .............. | G06F 3/0652 |
| 2021/0326959 A1* | 10/2021 | Haapoja | ................ | G06V 20/20 |

\* cited by examiner

METHODS AND SYSTEMS FOR PRESENTING USER SPECIFIC INFORMATION BASED ON MOBILE DEVICE PROXIMITY TO SHORT-RANGE WIRELESS TECHNOLOGY BEACONS

BACKGROUND

As users of mobile devices are constantly on the go, users of these mobile devices often want information that is specific to them to be easily accessible and customized for them. For example, users waiting for a departing flight, a doctor's appointment, a table at a restaurant, or other situation where information may need to be accessed/updated, may want to have easy access to updates that are relevant to them without the need to look up such updates on their mobile device. For instance, users may want this information presented on a public display device for easy access. However, as users want such information to be easily accessible and customized for them, generating and presenting such customized information on a public display device may be difficult as the display board may become cluttered with irrelevant user information.

SUMMARY

Methods and systems are disclosed herein for improvements in presenting user specific information. In particular, methods and systems are disclosed herein for improvements in presenting user specific information based on mobile device proximity to short-range wireless technology beacons. For example, by presenting user specific information on a public display board based on mobile device proximity to short-range wireless technology beacons, public display boards may not be cluttered with irrelevant user information as only users within a proximate distance of the display board (e.g., determined by proximity to short-range wireless technology beacons) are able to display their user specific/customized information.

While conventional systems may require a user to upload user specific information to a server to display on a public display board, these conventional systems may be unable to determine the proximate distance of the user; therefore, any user can simply display their information on the public display board without regard for how close or far away they are from it. This, in return, may cause a cluttered presentation of user specific information on public display boards which may hinder a user's access to such information. Additionally, these conventional systems may utilize technologies such as Global Positioning Systems (GPS), Image Recognition Based (IRB) technologies, Infrared (IR) sensors, and the alike, to determine a user's proximity to an object (e.g., a public display device). However, these technologies tend to utilize a lot of power and processing resources.

To solve these technical problems, the methods and system described herein utilize short-range wireless technology (SRWT) beacons to determine a proximate location of a user's mobile device to a display device and/or a short-range wireless technology beacon. The use of SRWT beacons, however, creates an additional technical hurdle. Namely, many users may be within the proximity of SRWT beacons, particularly in crowded areas such as airport lounges, and therefore display devices presenting information for these users may be cluttered to the point of obscurity. To overcome this additional technical challenge, the system may determine whether or not a user is nearby, looking at, or walking towards the display board (e.g., by determining the user's proximate location via SRWT beacons) and can generate and present customized user specific information to the display board based on such determination, thereby only presenting user specific information for user's within a proximate distance of the display board which helps reduce display board clutter. The system may do this by determining a first proximity value based on the first signal value (e.g., from a first SRWT beacon) and the second signal value (e.g., from a second SRWT beacon) in which the value indicates a proximate distance between the mobile device and the SRWT beacons. Using the proximate distances of the user from the different beacons, the system may determine whether or not the user is nearby, looking at, or walking towards the display board (e.g., based on the relative distances from the display board to the different beacons).

Accordingly, the methods and systems overcome the aforementioned technical problems as well as provide an improved mechanism for presenting user specific information based on mobile device proximity to short-range wireless technology beacons beyond those of conventional systems. Additionally, by using SRWT beacons, not only is mobile device battery life prolonged, but also less processing resources are required to determine the proximate location of the user's mobile device as compared to conventional systems.

In some aspects, methods and systems for presenting user specific information based on mobile device proximity to short-range wireless technology beacons are described. For example, the system may receive, via a first short-range wireless technology low energy (SRWTLE) beacon, a first signal comprising (i) a first signal value and (ii) a request for a user input. The system may receive, via a mobile device, a user input, wherein the user input comprises (i) a user identifier and (ii) a data item associated with an environment that the user is currently located in. The system may receive, via the first SRWTLE beacon, a second signal, wherein the second signal comprises a second signal value. The system may determine a first proximity value based on the first signal value and the second signal value, wherein the first proximity value indicates a first proximate distance between the mobile device and the first SRWTLE beacon. The system may, in response to the first proximity value satisfying a predetermined threshold value condition, generate for display, on a user interface, the user input.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data), unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details, or with an equivalent arrangement. In other cases, well-known structures and devices are shown in block diagram form in order to avoid unnecessarily obscuring the embodiments of the invention.

Figure 1:
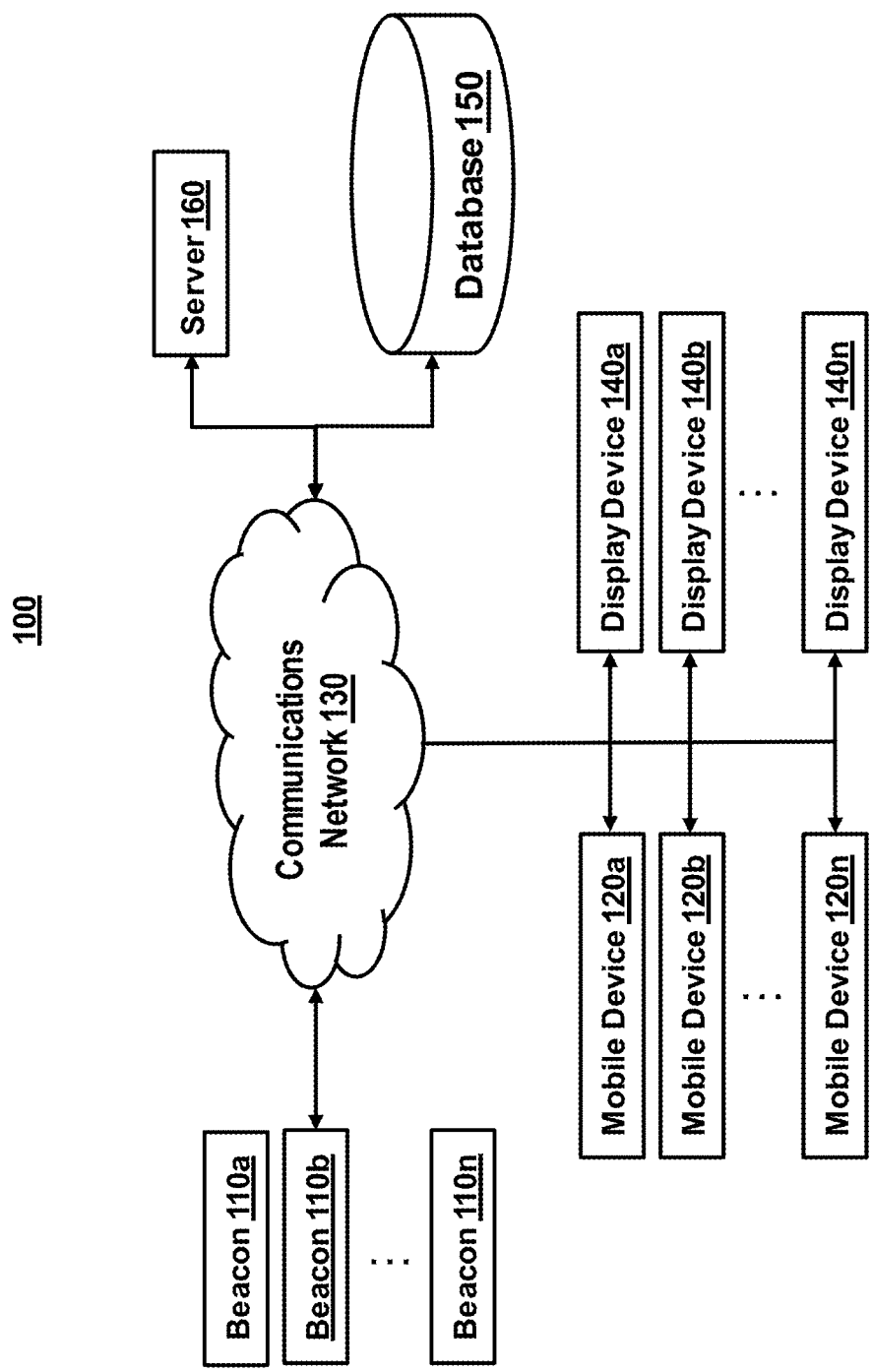
FIG. 1 shows a system diagram of components used for presenting user specific information based on mobile device proximity to short-range wireless technology beacons, in accordance with one or more embodiments.

FIG. 1 shows a system diagram of components used for presenting user specific information based on mobile device proximity to short-range wireless technology beacons, in accordance with one or more embodiments. It should be noted that the components shown in FIG. 1 are illustrative only, and in some embodiments, one component may perform functions associated with another component. Additionally or alternatively, in some embodiments, the functions of one component may be performed by a plurality of other components. Additionally or alternatively, system 100 may be implemented in a cloud environment, in which one or more of the components and/or functions of system 100 is provided by cloud components. In a cloud computing environment, various types of computing services for content sharing, processing, storage, and/or distribution are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 130.

FIG. 1 shows system 100 which includes a plurality of components used to present user specific information based on mobile device proximity to short-range wireless technology beacons. For example, the user specific information may be presented on digital display devices. Digital display devices may refer to display devices, such as digital billboards, electronic kiosks, outdoor signage, computer monitors, televisions, mobile device screens, digital projectors, and/or other available networks of screens. Digital display devices may display a variety of media assets. As used herein, "digital display device(s)" and "display device(s)" may be used interchangeably. As referred to herein, "media asset" and "content" may include any electronically consumable user asset, such as user specific information, customized user specific information, notifications, user inputs, television programming (including pay-per-view programs, on-demand programs (as in video-on-demand (VOD) systems)), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same.

Each of the components shown in system 100 may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a universal serial bus (USB) port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein. Each of the components shown in system 100 may also receive content and data via input/output (I/O) paths and may also include processors and/or control circuitry to send and receive commands, requests, and other suitable data using the I/O paths. For example, the I/O paths may be either wireless (e.g., short-range wireless technology, Bluetooth®, Wi-Fi®, cellular signals, and/or any other wireless communication paths) or wired (e.g., ethernet, cable, coaxial cable, USB connections, and/or any other wired communication paths) communication paths for transmitting and receiving data. The control circuitry may comprise any suitable processing circuitry. Each of the components in system 100 may also include a user input interface and/or display for use in receiving and displaying data.

System 100 includes beacons 110a-110n, which may be referred to collectively as beacon(s) 110. In some embodiments, beacon 110 may correspond to beacon 202 (FIG. 2) below. As used herein, "beacons," "wireless beacons," "short-range wireless technology beacons (SRWT)," and "short-range wireless technology low energy (SRWTLE) beacons" may be used interchangeably. Beacons 110 may be any wireless beacon including, but not limited to, short-range wireless technology beacons, short-range wireless technology low energy (SRWTLE) beacons, Bluetooth® beacons, Bluetooth® Low Energy (BLE) beacons, Wi-Fi® beacons, Wi-Fi® Aware beacons, ultrasound and/or ultrasonic beacons, and the alike. For example, wireless beacons may any device capable of transmitting one or more wireless signals. For instance, short-range wireless technology beacons may be a beacon that is used for exchanging data between fixed and mobile devices over short distances using UHF radio waves in the ISM bands, from 2.402 GHz to 2.48 GHz, and building personal area networks (PAN's). Additionally, short-range wireless technology low energy (SRWTLE) beacons may be a beacon that operates similarly to short-range wireless technology beacons that utilizes reduced power consumption and transmission power. An advantage of using such wireless beacons is that they alleviate privacy concerns as compared to directly connecting to a wireless network. For instance, beacons (e.g., beacon 110) are one-way transmitters. Beacons are unable to receive data from a connecting device (e.g., a mobile device), but rather transmit periodic data packets containing information that a device (e.g., mobile device) may comprehend. Beacons (e.g., beacons 110) may transmit one or more wireless signals (e.g., electromagnetic waves, wireless signals, short-range wireless technology signals, data packets, etc.) that include information. For example, the information that may be transmitted in the one or more signals may include a signal value (e.g., measured power, signal strength, beacon protocol data, timestamp data, identifier information, location data, etc.), and/or requests (e.g., advertisements, requests for data, request for a user input, etc.). The information transmitted in the one or more wireless signals may be understood/comprehended by one or more mobile devices (e.g., mobile devices 120).

In some embodiments, the information that may be included in the one or more signals may be in the form of signal values (e.g., integers, decimals, floating points, binary values, and the alike), such that the values may represent a quantity (e.g., a power level, measured power level, signal strength level) and/or other information (e.g., beacon protocol data, timestamp data, identifier information, location information, etc.) that may be comprehended by a mobile device.

System 100 also includes mobile devices 120a-120n, which may be referred to collectively as mobile device(s) 120. In some embodiments, mobile devices 120 may correspond to mobile device 204 (FIG. 2) below. Mobile device(s) 120 may refer to any computing device, including, but not limited to, smartphones, cellular devices, smart watches, wearable devices, pagers, laptop computer, tablet computer, handheld computers, "smart" devices, wireless devices, and/or other mobile devices. In some embodiments, mobile device(s) 120 may be capable of receiving one or more wireless signals from beacon(s) 110. For example, a mobile device may receive one or more signals being transmitted by a beacon (e.g., beacon 110) via one or more antennas included on the mobile device (e.g., mobile device 120).

System 100 also includes communications network 130. As used herein, "communications network" and "network" may be used interchangeably. Network 130 may include the Internet, a mobile phone network, a mobile voice or data network (e.g., a 5G or LTE network), a cable network, a public switched telephone network, or other types of communications networks or combinations of communications networks. The network may include both wired and wireless connection, as well as other short-range point-to-point communication paths, such as USB cables, IEEE 1394 cables, wireless paths (e.g., short-range wireless technology, SRWTLE, infrared, IEEE 802-11x, etc.), or other short-range communication via wired or wireless paths. It should be noted that network 130 is merely illustrative. In some embodiments, each component shown in system 100 may interact with each other directly (e.g., without the use of network 130) via one or more communication paths (or communication networks) between each component. In other embodiments, each component shown in system 100 may interact with each other indirectly (e.g., with the use of network 130 via one or more communication paths (or communication networks)) such that all data/information is transmitted and received via network 130.

Additionally, system 100 includes display devices 140a-140n, which may be referred to collectively as display device(s) 140. In some embodiments, display devices 140 may correspond to display device 206 (FIG. 2) below. Display devices (e.g., display device 206 (FIG. 2)) may refer to display devices, such as digital billboards, electronic kiosks, outdoor signage, computer monitors, televisions, mobile device screens, digital projectors, and/or other available networks of screens, as previously mentioned. As shown in FIG. 1, media assets (e.g., user specific information) displayed on display devices 140 may be received over communications network 130. In some embodiments, display devices 140 may be a virtual display device (e.g., cloud-based input/output circuitry, virtual graphics card, virtual machine, and the alike), such that in lieu of a physical display device, the system may generate and/or present user specific information in a virtual manner. For example, user specific information may be presented on a virtual machine, and such data may be accessible by one or more computing platforms (e.g., virtual machines, computers, laptops, desktops, etc.) before such data (e.g., user specific information) is physically presented on a physical display device (e.g., computer monitor, television, etc.).

System 100 also includes database 150. Database 150 may be referred to as any electronic storage capable of storing data. Database 150 may include one or more electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

Database 150 may also receive content and data via I/O paths. Additionally, each of the components shown in system 100 may communicate with database 150 to store or retrieve information included in database 150. For example, database 150 may be capable of storing user identifiers, environmental information, proximity threshold conditions, and other information. For instance, database 150 may store a variety of user identifiers (e.g., a name of a user, an account name, a device identifier, and/or another user identifier) for users who are signed up for a service (e.g., concierge service, an application, a website, lounge access, etc.). These user identifiers may be used to verify if a user has signed up for a particular service, to retrieve a user's identifier, or other use. For example, system 100 may access database 150 to compare a received user identifier (e.g., via a user input) to the user identifiers stored within database 150 to verify if a particular user is signed up for a service. Upon identifying a match between a received user identifier and a stored user identifier, the system may select the user identifier to be included in user specific information. As another example, database 150 may include environmental information that is associated with a location. For instance, database 150 may store a log of locations (e.g., geographic locations) that include one or more lounges, rooms, or areas and the sizes (e.g., in square feet, square meters, etc.) of the one or more lounges, rooms, or areas. The sizes of the lounges, rooms, or areas may correspond to proximity threshold conditions (e.g., a distance between a mobile device 120 and one or more beacons 110, a distance range between a mobile device 120 and one or more beacons 110, etc.) for a given location when a mobile device is interacting with one or more beacons. For instance, a larger room may require a larger proximity threshold condition as compared to a smaller room because a display device can be seen by more users. On the contrary, a smaller room may require a smaller proximity threshold condition as compared to a larger room because a higher concentration of users may be in the smaller room thus, making it more difficult to see a user's user specific information on one or more display devices 140. In this way, the system may have varying proximity threshold condition values based on a geographic location, any lounges, rooms, or areas at a geographic location, and/or the sizes of any lounges, rooms, or areas at a geographic location. In this way, the system may efficiently display user specific information on one or more display devices.

System 100 may also include server 160. Server 160 may include one or more servers that include database servers, file servers, web servers, application servers, and the alike. For example, server 160 may communicate with each of the components of system 100 to transmit/receive information from each of the components of system 100. For example, server 160 may generate for display one or more media assets (e.g., user specific information). As another example, server 160 may be programmed with one or more computer program instructions, and may also include one or more electronic storages (e.g., as described above). As an example, users signed up for a particular service (e.g., concierge service) may input log-in information on an application on their mobile device. The mobile device (e.g., mobile device 120) may transmit such log-in information to a web server (e.g., server 160) for verification purposes. Once the server has verified a user, the server may communicate with one or more components of system 100 and generate, for display, user specific information on one or more display devices (e.g., display device 140). In some embodiments, the server may act as control circuitry (e.g., cloud-based control circuitry, control circuitry, or other controlling software/hardware) that controls the flow of information. For example, the server (e.g., server 160) may be responsible for carrying out a set of steps (e.g., a method, an algorithm, a series of steps, a software program). For instance, the server may act as a communication point that ensures particular conditions (e.g., threshold conditions, threshold values, proximity conditions, proximity threshold conditions, etc.) are met before proceeding to the next step. In this way, a smooth flow of operations may be achieved such that the system may present user specific information based on mobile device proximity to short-range wireless technology beacons.

Figure 2:
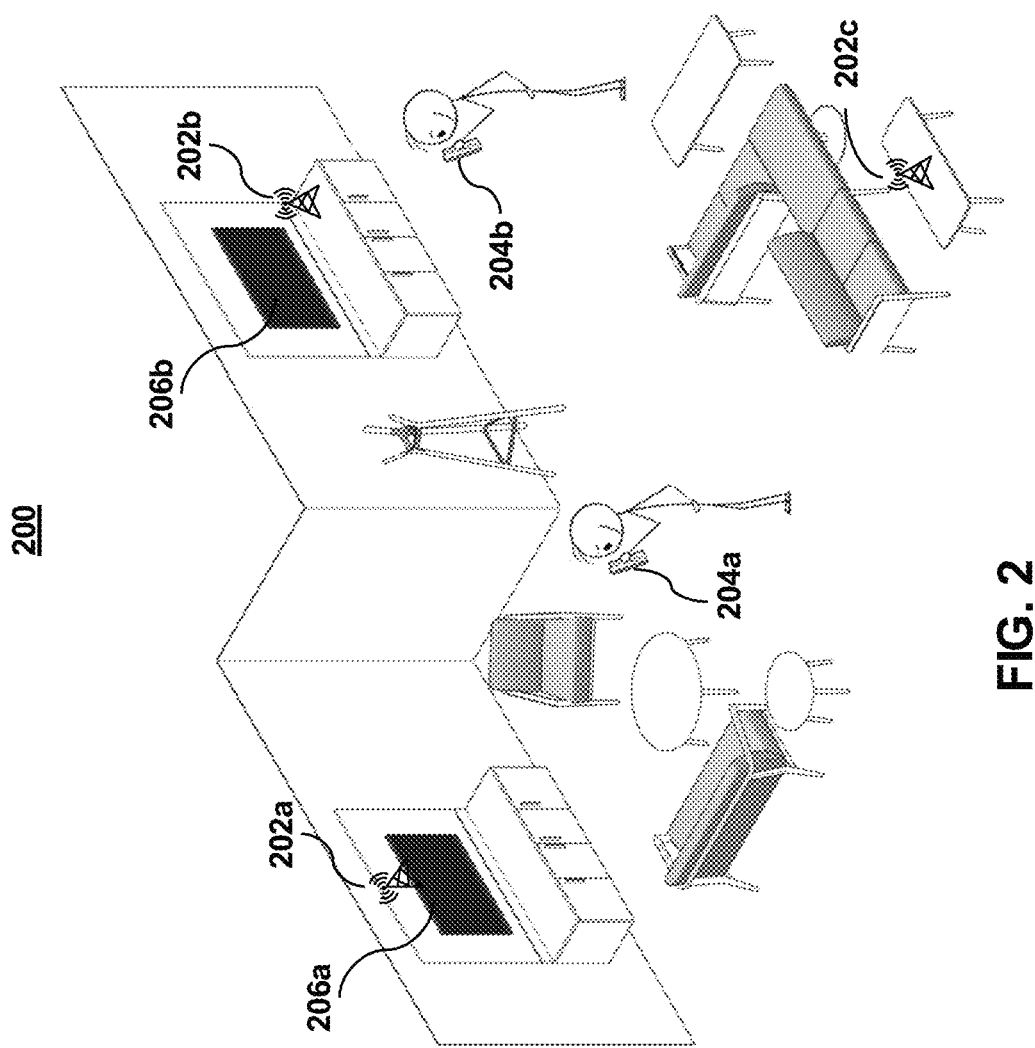
FIG. 2 shows an illustrative diagram of mobile device(s) at proximate locations to short-range wireless technology beacons for presenting user specific information based on mobile device proximity to short-range wireless technology beacons, in accordance with one or more embodiments.

FIG. 2 shows an illustrative diagram of mobile device(s) at proximate locations to short-range wireless technology beacons for presenting user specific information based on mobile device proximity to short-range wireless technology beacons, in accordance with one or more embodiments. FIG. 2 additionally shows short-range wireless technology beacons 202a-206c, which may be collectively referred to as beacon(s) 202. As shown in diagram 200, the system may monitor proximate locations of a user's mobile device 204 with respect to one or more short-range wireless technology beacons 202. As mentioned above, short-range wireless technology beacons 202 may transmit one or more signals (e.g., electromagnetic waves, wireless signals, short-range wireless technology signals, data packets, etc.) that include information. For example, the information that may be transmitted in the one or more signals may include a signal value (e.g., measured power, beacon protocol data, timestamp data, identifier information, location data, etc.) and/or requests (e.g., advertisements, requests for data, request for a user input, etc.). In some embodiments, short-range wireless technology beacons 202 may be short-range wireless technology low energy (SRWTLE) beacons. The advantage that SRWTLE beacons have over classic short-range wireless technology (e.g., SRWT) beacons are that they are low energy beacons that may transmit low energy signals and may transmit less data per signal. This in return is advantageous to computing devices (e.g., mobile devices, computers, receivers, and the alike) due to the reduction of processing resources needed to process information from signals transmitted from SRWTLE beacons. For example, classic short-range wireless technology beacons transmit more data per signal which requires a receiving device (e.g., a mobile device, a computer, or the alike) to utilize additional processing resources to parse through the information included in the signal. However, to conserve the battery life of such receiving devices, the use of SRWTLE beacons may help accomplish such task because they transmit less information per signal, thereby requiring less processing resources to determine the information included in the signal. Another advantage of using SRWTLE beacons is that they are able to conserve their own battery life by transmitting such low energy signals. These SRWTLE beacons do not require a large power source (e.g., a wall outlet, large battery, etc.) and may be placed in locations that classic short-range wireless technology beacons may not be. For example, SRWTLE beacons may be powered by a small, compact, button cell battery and operate for an extended period of time. Additionally, because of their low energy requirement, SRWTLE beacons are smaller than classic short-range wireless technology beacons and can be hidden from plain view sight, which may be more aesthetically pleasing to users, thus improving the user's experience.

In some embodiments, beacons (e.g., beacon 202) may be integrated into one or more display devices (e.g., display device 206). For example, beacon 202a may be integrated into display device 206a. In some embodiments, however, beacons (e.g., beacon 202) may be a stand-alone unit (e.g., detached from another device). For example, beacon 202b and/or beacon 202c may be stand-alone beacons. In this way, multiple beacons (e.g., beacons 202) may be placed within an environment (e.g., a room, a lounge, inside, outside, etc.) without the bulk of another device (e.g., a display device). Furthermore, multiple beacons may be placed such that a mobile device 204 may receive signals from multiple beacons at once, aiding in determining the proximate location of mobile device 204 to one or more short-range wireless technology beacons by using trilateration. In this way, by using multiple short-range wireless technology beacons (e.g., beacons 202), the proximate location of a user's mobile device 204 may be determined with greater accuracy as compared to other methods.

Additionally, FIG. 2 shows display devices 206a-206b, which may be collectively referred to as display device(s)

206. Display devices may present user specific information on a user interface presented on the display device. In this way, users need not rely on their mobile devices to access this user specific information, thereby conserving battery life on their mobile devices and increasing user satisfaction. The system may use a plurality of techniques to present user specific information based on the proximity to short-range wireless technology beacons on one or more display devices 206. As an example, the system may determine that mobile device 204 is within a threshold distance of short-range wireless technology beacon 202, and in return may generate for display, user specific information to be presented on display device 206. In some embodiments, multiple display devices may be present in a lounge, room, or other area. In other embodiments, only one display device may be present in a lounge, room, or other area.

Figure 3:
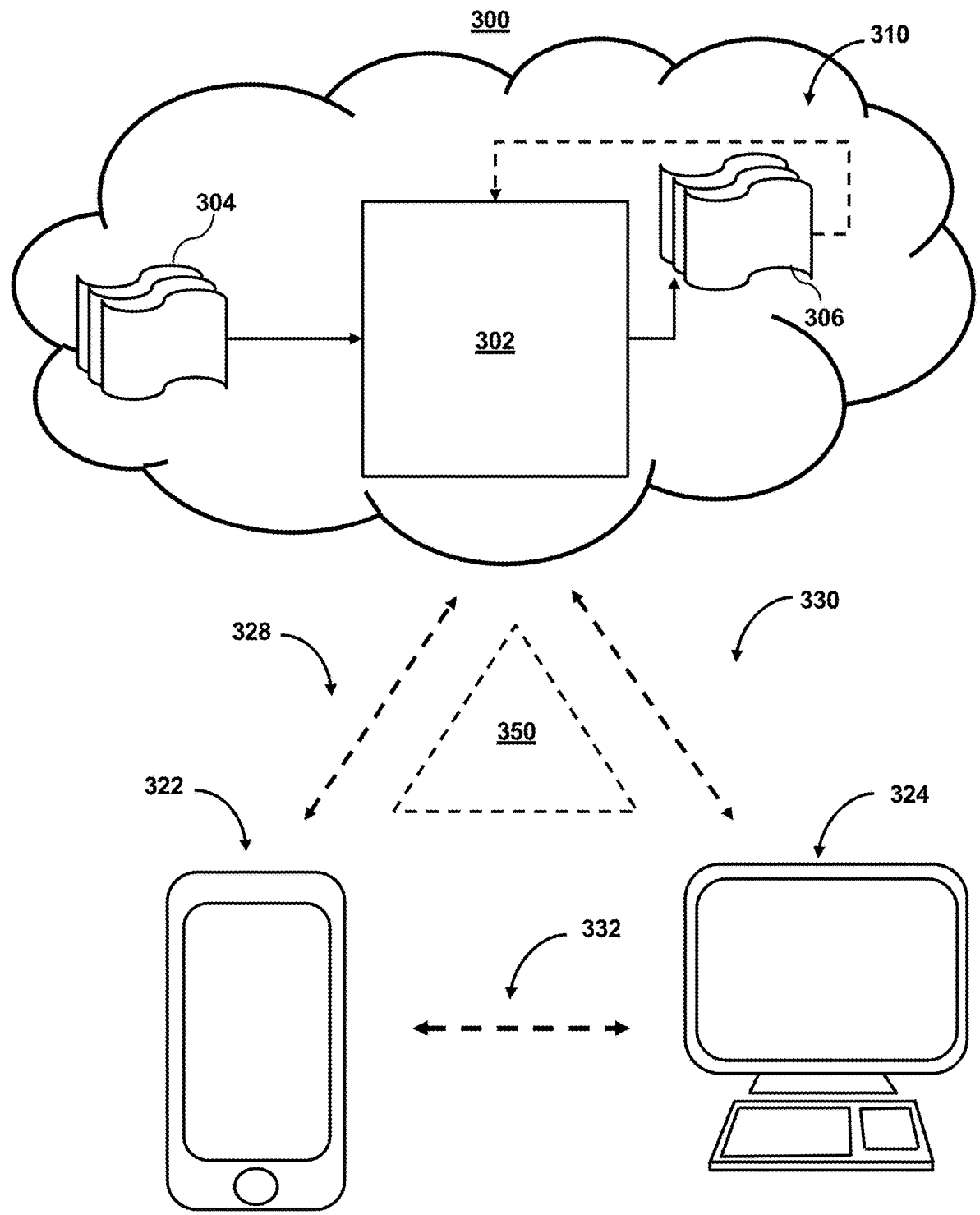
FIG. 3 shows illustrative system components for presenting user specific information based on mobile device proximity to short-range wireless technology beacons, in accordance with one or more embodiments.

FIG. 3 shows illustrative system components for presenting user specific information based on mobile device proximity to short-range wireless technology beacons, in accordance with one or more embodiments. For example, the system may represent the components used for presenting user specific information based on mobile device proximity to short-range wireless technology beacons, as shown in FIG. 1. As shown in FIG. 3, system 300 may include mobile device 322 and user terminal 324. In some embodiments, mobile device 322 and/or user terminal 324 may correspond to mobile device 120 (FIG. 1) and/or mobile device 204 (FIG. 2). While shown as a smartphone and personal computer, respectively, in FIG. 3, it should be noted that mobile device 322 and user terminal 324 may be any computing device, including, but not limited to, a laptop computer, a tablet computer, a handheld computer, other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users, may, for instance, utilize one or more devices to interact with one another, one or more servers, or other components of system 300. It should be noted that, while one or more operations are described herein as being performed by particular components of system 300, those operations may, in some embodiments, be performed by other components of system 300. As an example, while one or more operations are described herein as being performed by components of mobile device 322, those operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via I/O paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., user specific information).

Additionally, as mobile device 322 and user terminal 324 are shown as touchscreen smartphones, these displays also act as user input interfaces. It should be noted that in some embodiments, the devices may have neither user input interface nor displays, and may instead receive and display content using another device (e.g., a dedicated display device, such as a computer screen, and/or a dedicated input device, such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may be a database configured to store user data for a user. For example, the database may include user data that the system has collected about the user through prior interactions, both actively and passively. For example, the user data may describe one or more characteristics of a user, a user device, and/or one or more interactions of the user with a user device and/or application generating responses, queries, and/or notifications. Alternatively, or additionally, the system may act as a clearinghouse for multiple sources of information about the user. This information may be compiled into a user profile. Cloud components 310 may also include control circuitry configured to perform the various operations needed to generate alternative content. For example, the cloud components 310 may include cloud-based storage circuitry configured to generate alternative content. Cloud components 310 may also include cloud-based control circuitry configured to run processes to determine alternative content. Cloud components 310 may also include cloud-based input/output circuitry configured to display alternative content.

Cloud components 310 may include model 302, which may be a machine learning model. Model 302 may take inputs 304 and provide outputs 306. The inputs may include multiple datasets, such as a training dataset and a test dataset. Each of the plurality of datasets (e.g., inputs 304) may include data subsets related to user data, original content, alternative content, mobile device locations, number of users in a given area, user identifiers, user specific information, etc. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive user data (e.g., a user identifier, the location of the user's mobile device, a user input, number of other users, etc.) as input to model 302. The system may use the user data to generate predictions related to how to present user specific information on a display device (e.g., display device 206). For instance, if multiple instances of user specific information are presented on display device 206, the system may generate predictions on how to resize/rescale the current instances of user specific information such that another instance of user specific information may be presented. The generated predictions related to how to present user specific information on a display device may be fed back to model 302 to further train model 302. In some embodiments, cloud components 310 may be integrated into mobile device 322 and/or user terminal 324 such that cloud components 310 may operate in an on-device fashion.

In another embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302.

Figure 4:
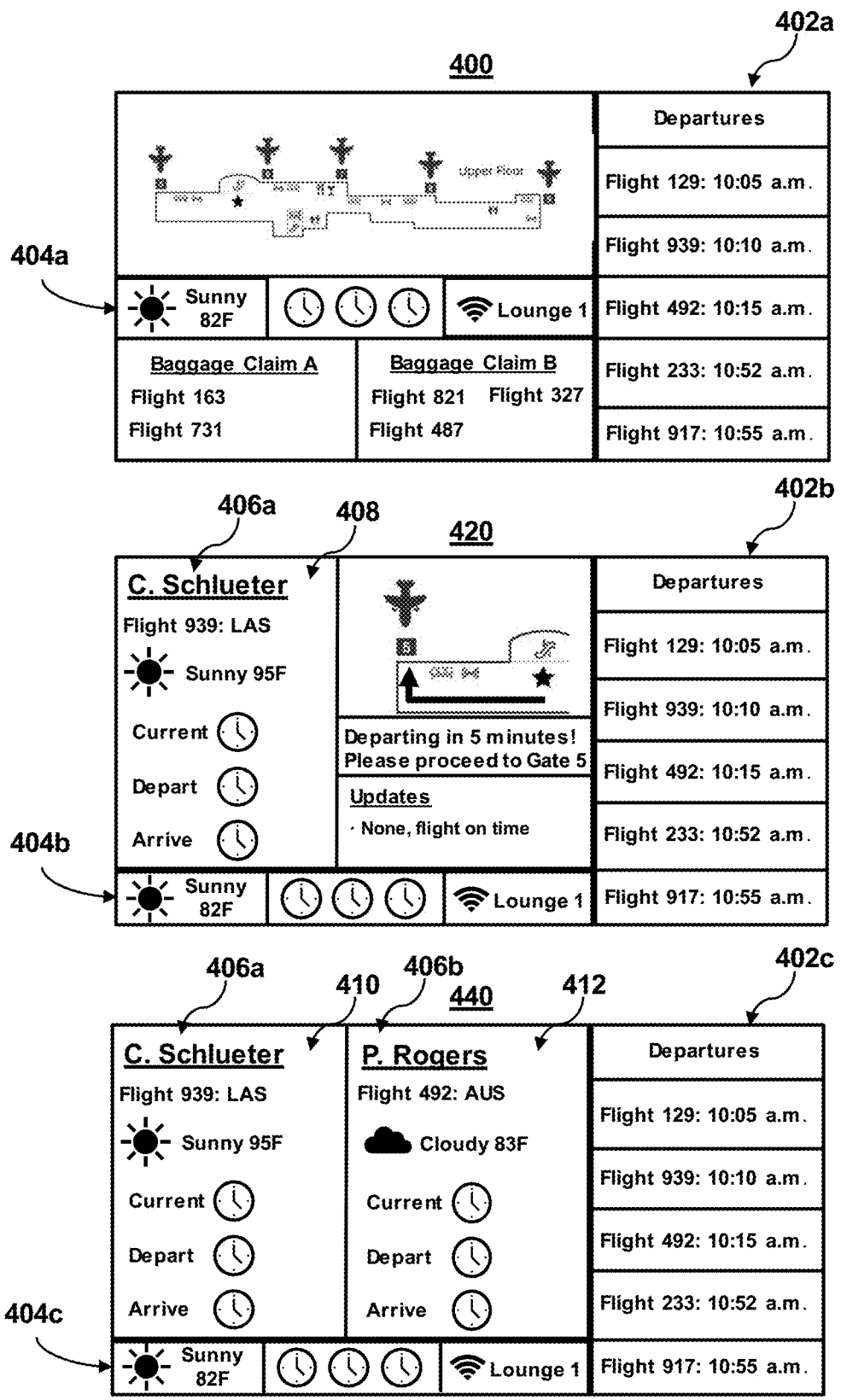
FIG. 4 shows illustrative user interface(s) for presenting user specific information based on mobile device proximity to short-range wireless technology beacons, in accordance with one or more embodiments.

FIG. 4 shows illustrative user interface(s) for presenting user specific information based on mobile device proximity to short-range wireless technology beacons, in accordance with one or more embodiments. For example, FIG. 4 shows illustrative user interfaces (e.g., user interface 400, user interface 420, and user interface 440). As referred to herein, a user interface may include mandatory information (e.g., mandatory information 402a-402c), which may be collectively referred to as mandatory information 402. A user interface may also include general information (e.g., general information 404a-404c), which may be collectively referred to as general information 404. In some embodiments, a user interface may include one or more user identifiers (e.g., user identifier 406a, user identifier 406b, etc.), which may be collectively referred to as user identifier 406. In some embodiments, a user interface may include user specific information (e.g., user specific information 408, user specific information 410, user specific information 412).

As shown in FIG. 4, mandatory information 402 may be presented on a user interface. As referred to herein, mandatory information (e.g., mandatory information 402) may include information that must be displayed at all times based on an environment that a display device/user interface is located. For instance, at an airport, it may be mandatory that on all display devices, current departure information must be presented on a user interface (e.g., for legal reasons, for protocol reasons, for policy reasons, etc.). Therefore, each user interface (as shown in FIG. 4) may present current departure information as mandatory information 402. As another example, at a doctor's office, it may be mandatory that on all display devices, current appointment times must be presented on a user interface. Therefore, each user interface (as shown in FIG. 4) may present current appointment times as mandatory information 402. In some embodiments, where the environment dictates that no mandatory information needs to be displayed/presented, mandatory information may be omitted from presentation.

As shown in FIG. 4, general information (e.g., general information 404) may be presented on a user interface. For example, general information may be information that is presented based on the environment in which a display device may be located that is applicable to the general public viewing such information. For instance, in a use case, such as an airport, general information may include the current weather, world clocks, Wi-Fi® host names/passwords, baggage claim locations for incoming flights, an overall map of the airport may be presented, and other information. In some embodiments, when no users are detected to be within a proximate distance of one or more beacons (e.g., beacons 202 (FIG. 2)) and/or one or more display devices (e.g., display devices 206 (FIG. 2)), mandatory information and general information may be presented on a user interface. For example, user interface 400 is an illustrative user interface of such a case.

In some embodiments, when one or more users are determined to be within a proximate distance of one or more beacons (e.g., beacons 202 (FIG. 2)) and/or one or more display devices (e.g., display devices 206 (FIG. 2)), user specific information (e.g., user specific information 408) may be presented on a user interface. As referred to herein, user specific information may be information that is associated with a user. For example, user specific information may include a user identifier (e.g., user identifier 406), information a user may be interested in, information that is based on a user's location, information associated with an environment of the user, information based on a user's input, or other information. For example, in a use case, user specific information may be flight information that is related to a user. As another example, user specific information may be doctor's appointment information that is related to a user. Furthermore, as another example, user specific information may be restaurant reservation information that is related to a user. It should be noted that other examples of user specific information exist, and these examples are merely exemplary.

In some embodiments, with respect to user interface 420, user specific information 408 may be presented on a user interface (e.g., in one or more portions of user interface, as shown in FIG. 4). For example, user specific information 408 may include user specific flight information such as, but not limited to, the weather at an arriving location, a flight number, the current time, departure time, arrival time, a map of an airport, a navigational map of an airport (e.g., showing the user where to go), flight update information, one or more messages, a user identifier (e.g., user identifier 406a), or other information. Contrary to general information (e.g., general information 404), user specific information is applicable to a specific user of the system (e.g., system 100 (FIG. 1)), while general information is applicable to the general public viewing the user interface. In some embodiments, when only one user is determined to be within a proximate distance of one or more beacons (e.g., beacons 202) and/or one or more display devices (e.g., display devices 206 (FIG. 2)), the user's user specific information may be presented on a user interface (e.g., user interface 420). In some embodiments, general information may also be included in the user interface. In this way, with only one user being determined to be within a proximate distance of one or more beacons, more user specific information may be presented on a user interface as compared to when multiple users are within a proximate distance of one or more beacons, as described below. In such case, user experience may be increased as an increased amount of user specific information may be presented to a user.

In some embodiments, one or more user's user specific information may be presented on a user interface. In some embodiments, general information may also be included in addition to the one or more user's user specific information. For example, with respect to user interface 440, two user's user specific information (e.g., user specific information 410 and user specific information 412) is presented in conjunction with general information (e.g., general information 404). In some embodiments, as shown in user interface 440, a lesser amount of user's user specific information may be presented. For example, to facilitate additional users, the amount of user specific information presented on a user interface for each user may be reduced to fit such user specific information on the user interface. For example, user interface 440 illustrates such case by including each user's user identifier, flight information, arrival location weather information, the current time, each user's flight departure and arrival time. It should be noted, that although user interface 440 depicts the aforementioned information, other user specific information may be presented. By presenting a reduced amount of user specific information for each user when multiple user specific information is to be presented on a user interface, the system may facilitate an increase in user experience as additional user's user specific information may be presented on such user interfaces. Additionally, it should be noted that, although FIG. 4 only shows three user interfaces (e.g., user interface 400, user interface 420, and user interface 440), other embodiments of user interfaces may be used based on the number of users within a proximate distance of the one or more beacons (e.g., beacons 202) and/or one or more display devices (e.g., display devices 206), and should not be limited to these three example user interfaces, as these examples are merely illustrative.

Figure 5:
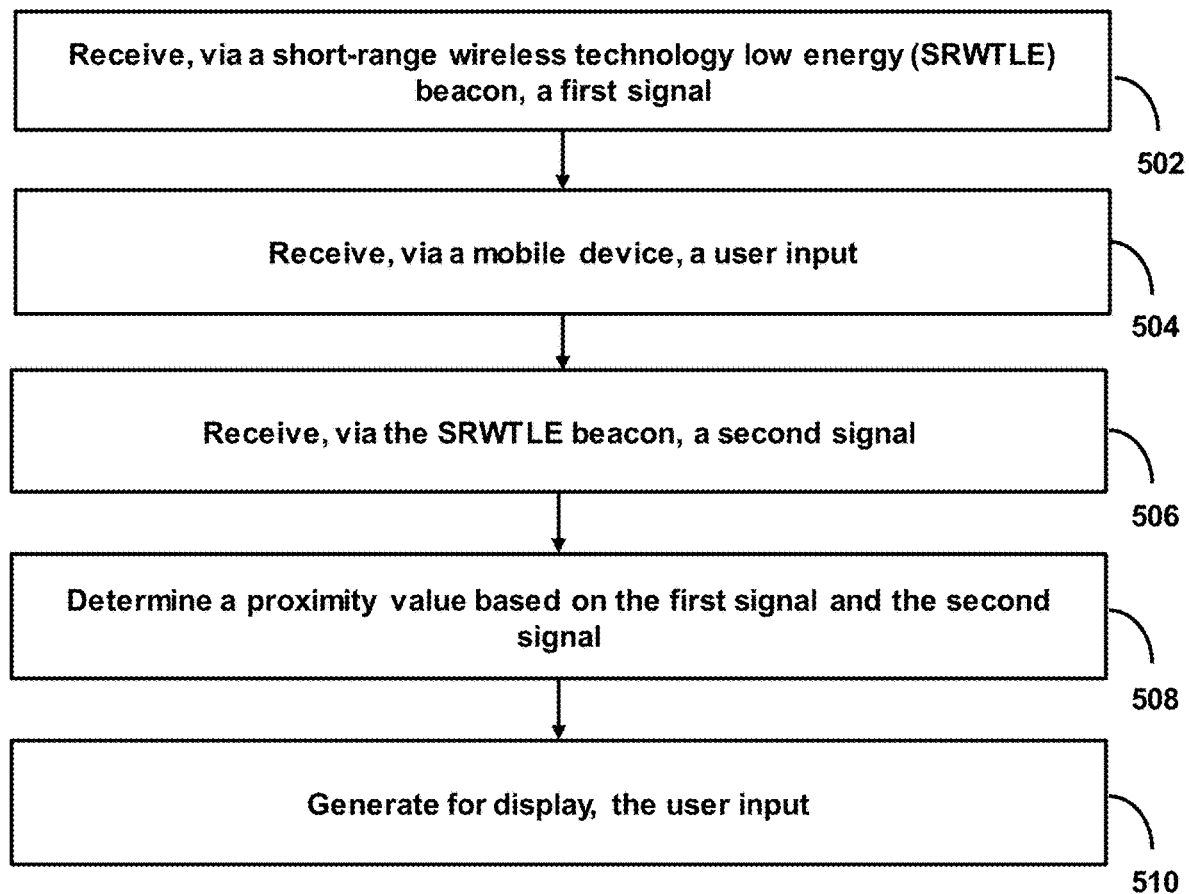
FIG. 5 shows a flowchart of the steps involved in presenting user specific information based on mobile device proximity to short-range wireless technology beacons, in accordance with one or more embodiments.

FIG. 5 shows a flowchart of the steps involved in presenting user specific information based on mobile device proximity to short-range wireless technology beacons, in accordance with one or more embodiments. For example, the system may use process 500 (e.g., as implemented on one or more system components as described in FIGS. 1-4) in order to present user specific information based on mobile device proximity to short-range wireless technology beacons, in accordance with one or more embodiments.

At step 502, process 500 (e.g., using one or more components described in system 100 (FIG. 1) and/or system 300 (FIG. 3)) may receive, via a short-range wireless technology low energy (SRWTLE) beacon, a first signal. For example, the system may receive, via a first SRWTLE beacon, a first signal comprising (i) a first signal value and (ii) a request for a user input. For example, the first signal value may include signal strength information, location information, time information, or other information. As another example, the request for a user input may include a request for user specific information, a user identifier, information related to an environment the user is currently located, location information, or other information.

At step 504, process 500 (e.g., using one or more components described in system 100 (FIG. 1) and/or system 300 (FIG. 3)) the system may receive, via a mobile device, a user input. For example, the system may receive, via a mobile device, a user input, wherein the user input comprises (i) a user identifier and (ii) a data item associated with an environment the user is currently located. In some embodiments, the user identifier may be a string of characters, a device identifier, emojis, plain text, a nickname, a user's initials, or any other information that may identify a particular user. In some embodiments, a data item associated with an environment the user is currently located may be information that is related to a user's current environment. For example, in a use case, a user located at an airport may possess flight information (e.g., a data item) for their departing flight. The user may input their flight information (e.g., flight number, airline company, depart time, and the alike) such that the system may receive their flight information to be displayed on one or more display devices. In another use case, such as a user located at a restaurant, a user may input a reservation information (e.g., a data item). The reservation information may include a table number, reservation time, booking information, and the alike, such that the system may receive such reservation information to be displayed on one or more display devices.

At step 506, process 500 (e.g., using one or more components described in system 100 (FIG. 1) and/or system 300 (FIG. 3)) the system may receive, via the first SRWTLE beacon, a second signal. For example, the system may receive, via the first SRWTLE beacon, a second signal, wherein the second signal comprises a second signal value. For example, in some embodiments, the second signal value may include a measured power value, beacon protocol data, timestamp data, identifier information, location data, or other information.

At step 508, process 500 (e.g., using one or more components described in system 100 (FIG. 1) and/or system 300 (FIG. 3)), the system may determine a proximity value based on the first signal and the second signal. For example, the system may determine a first proximity value based on the first signal value and the second signal value, wherein the first proximity value indicates a first proximate distance between the mobile device and the first SRWTLE beacon. In some embodiments, the first proximity value may be an integer, floating point value, decimal value, percentage, or other unit that may represent a distance in inches, feet, centimeters, meters, and the alike.

Additionally or alternatively, the first signal value may be a first signal strength value and the second signal value may be a second signal strength value. For example, the first signal strength value and the second signal strength value each may be a measured power level. For instance, measured power is the expected received signal strength of a beacon's (e.g., beacon 202 (FIG. 2)) signal at a predetermined distance. Beacons (e.g., beacon 202 (FIG. 2)) have predetermined specifications for what their measured power level should be at a predetermined distance (e.g., 0.5 meters, 1 meter, 6 inches, 1 foot, etc.). A mobile device (e.g., mobile device 204 (FIG. 2)) may measure the strength of one or more signals transmitted by one or more beacons to determine a Received Signal Strength Indicator (RSSI) value. In some embodiments, the RSSI value may be measured in decibels, decibel-milliwatts, on a logarithmic scale, and/or as a percentage.

In some embodiments, the system may determine the first proximity value based on such first signal strength value and second signal strength value by determining, via the mobile device, a first received signal strength value and a second received signal strength value based on the first signal strength value and the second signal strength value, respectively. For example, the mobile device may measure the strength of the first signal and compare it to the first signal value (e.g., first measured power value) to determine a first received signal strength value. Additionally, the mobile device may measure the strength of the second signal and compare it to the second signal value (e.g., the second measured power value) to determine a second received signal strength value. The system may then compare the second received signal strength value to the first received signal strength value. For example, the system may compare the second received signal strength value to the first received signal strength value to determine, based on the comparison, that the second received signal strength value is greater than the first received signal strength value. The system may then determine the first proximity value based on the second received signal strength value. In this way, the system may determine if a user and/or mobile device is nearby, looking at, or walking towards one or more beacons and/or display devices, thereby reducing the amount of unnecessary user specific information that may be presented on one or more display devices. Additionally, in this way, the system may facilitate a reduction of processing resources (e.g., as compared to conventional system's reliance on GPS methods) to determine the proximate locations of mobile devices, thereby prolonging mobile device battery life.

Additionally or alternatively, the first signal value may be a first timestamp value and the second signal value may be a second timestamp value. For example, the system may determine the first proximity value based on the first timestamp value and the second timestamp value. For example, the system may determine, via the mobile device, a first arrival time of the first timestamp value and a second arrival time of the second timestamp value. For instance, when a beacon (e.g., short-range wireless technology beacon 202 (FIG. 2)) transmits a signal, the signal may include a timestamp value of when the signal was transmitted from the beacon. The system may compare the timestamp included in the signal from the beacon to the time at which the system received the signal from the short-range wireless technology beacon. In some embodiments, the system may determine a first difference (e.g., a difference in time between the first signal's timestamp value and the time received value). In this way, the system may determine the amount of time from when the first signal was transmitted to the time the first signal was received (e.g., by mobile device 204 (FIG. 2)). Additionally, the system may determine a second difference (e.g., a difference in time between the second signal's timestamp value and the time received value). The system may further compare these two differences to each other. For instance, the system may determine that the second difference is less than the first difference. The system may select, based on determining that the second difference is less than the first difference, the second difference. In response to selecting the second difference, the system may determine the first proximity value based on the second difference. In this way, because the second difference is less than the first difference, the mobile device (e.g., mobile device 204) may be traveling towards the short-range wireless technology beacon transmitting the respective signals, thereby allowing the system to properly display user specific information on a display device (e.g., display device 206) without displaying unnecessary user specific information. Additionally, in this way, the system may facilitate a reduction of user specific information clutter by ensuring that only users and/or mobile devices that are within a proximate location of short-range wireless technology beacon 202 may present user specific information. Furthermore, in this way, the system may facilitate a reduction of processing resources (e.g., as compared to conventional system's reliance on GPS methods) to determine the proximate locations of mobile devices, thereby prolonging mobile device battery life.

Additionally or alternatively, the system may determine the first proximity value based on receiving signals from multiple beacons (e.g., beacons 202 (FIG. 2)). For example, the system may receive, via a second SRWTLE beacon, a third signal. The third signal may include a third signal value (e.g., location information of the second SRWTLE beacon and/or timestamp information of when the signal is transmitted and/or other information). The system may receive, via a third SRWTLE beacon, a fourth signal, and the fourth signal may include a fourth signal value (e.g., location information of the third SRWTLE beacon and/or timestamp information of when the signal is transmitted and/or other information). In some embodiments, the system may also determine the time at which the first signal, the third signal, and the fourth signals are received (e.g., with respect to the mobile device) to be used during trilateration calculations. The system may determine, based on trilateration of the first signal, the third signal, and the fourth signal, a first proximate location of the mobile device. For example, the first proximate location may be in the form of coordinates and/or a distance (e.g., in inches, feet, centimeters, meters, miles, kilometers, etc.) between the mobile device and the first beacon, the second beacon, and the third beacon. In this way, the system may determine an accurate location (e.g., of the mobile device) by using multiple beacon signals. The system may then receive, via the second SRWTLE beacon, a fifth signal, and the fifth signal may include a fifth signal value (e.g., location information of the second SRWTLE beacon and/or timestamp information of when the signal is transmitted and/or other information). The system may receive, via the third SRWTLE beacon, a sixth signal, and the sixth signal may include a sixth signal value (e.g., location information of the third SRWTLE beacon and/or timestamp information of when the signal is transmitted and/or other information). In some embodiments, the system may also determine the time at which the second signal, the fifth signal, and the sixth signals are received (e.g., with respect to the mobile device) to be used during trilateration calculations. The system may determine, based on trilateration of the second signal, the fifth signal, and the sixth signal value, a second proximate location of the mobile device. For example, the second proximate location may be in the form of coordinates and/or a distance (e.g., in inches, feet, centimeters, meters, miles, kilometers, etc.) between the mobile device and the first beacon, the second beacon, and the third beacon. The system may then determine, based on comparing the first proximate location to the second proximate location, the first proximity value.

For example, the system may receive the first signal from a first SRWTLE beacon, a third signal from a second SRWTLE beacon, and a fourth signal from a third SRWTLE beacon. Each of the first, third, and fourth signals may include a signal value (e.g., location information, timestamp information, identifier information, etc.). In some embodiments, each signal value of the first, third, and fourth signals may include the location of a corresponding SRWTLE beacon transmitting the respective signal, and a timestamp value associated with when the corresponding SRWTLE beacon transmitted the signal. The system may use trilateration based on the information included in the first, third, and fourth signals to determine a first proximate location of the mobile device. As another example, the system may receive the second signal from a first SRWTLE beacon, a fifth signal from a second SRWTLE beacon, and a sixth signal from a third SRWTLE beacon. Each of the second, fifth, and sixth signals may include a signal value (e.g., location information, timestamp information, identifier information, etc.). The system may use trilateration based on the information included in the second, fifth, and sixth signals to determine a second proximate location of the mobile device. The system may compare the first proximate location (e.g., the first proximate location of the mobile device) to the second proximate location (e.g., the second proximate location of the mobile device) and determine whether the mobile device is moving towards/moving away from one or more display devices. For example, if the second proximate location is a shorter distance to one or more display devices and/or beacons as compared to the first proximate location, the system may determine that the user is walking towards the one or more display devices and/or beacons. The system may then determine, based on the comparison of the first proximate location and the second proximate location, the first proximity value. For example, the system may determine the first proximity value by comparing the first proximate location and the second proximate location to determine if the user is walking towards or walking away from one or more beacons and/or display devices. In some embodiments, the system may select the second proximate location in response to the second proximate location being a shorter distance (e.g., with respect to the mobile device to one or more display devices and/or beacons). Based on the second proximate location, the system may determine the first proximity value, which may represent a distance between the mobile device and one or more beacons and/or display devices. In this way, the system may determine that a user is walking towards one or more display devices and/or mobile devices, thereby allowing that user's user specific information to be presented on a user interface. Additionally, in this way, the system may facilitate a reduction of processing resources (e.g., as compared to conventional system's reliance on GPS methods) to determine the proximate locations of mobile devices, thereby prolonging mobile device battery life.

Additionally or alternatively, the system may determine, based on the user input, a proximate location of the mobile device. The system may determine, based on the proximate location of the mobile device, the first proximity value. For example, a user may provide a user input (e.g., check-in status, a location the user is currently located, a data item associated with the location the user is currently located, or other information). In a use case, for a user at an airport, the user may input their check-in status while waiting in an airport lounge. The system may determine, based on the user check-in status, that the user (and the user's mobile device), is located in the vicinity of one or more display devices (e.g., due to the user's check-in status in the lounge). Therefore, the system may determine the first proximity value, and in return, present user specific information on such display devices. As another example, for a user at a restaurant, the user may input that they have arrived at the restaurant. The system may determine based on such input, that the user (and the user's mobile device) is located at a restaurant (e.g., proximate location), and the system may then determine the proximity value based on the proximate location of the user and/or the user's mobile device. In this way, the system may facilitate a reduction of processing resources (e.g., as compared to conventional system's reliance on GPS methods) to determine the proximate locations of mobile devices, thereby prolonging mobile device battery life.

At step 510, process 500 (e.g., using one or more components described in system 100 (FIG. 1) and/or system 300 (FIG. 3)), the system may generate for display, the user input. For example, the system may, in response to the first proximity value satisfying a predetermined threshold value condition, generate for display, on a user interface, the user input. For example, the predetermined threshold value condition may represent a threshold value of distance between the mobile device and one or more beacons and/or display devices. In some embodiments, the predetermined threshold value condition may be a pre-programmed value condition (e.g., meeting or exceeding a predetermined value, less than a predetermined value, etc.). In some embodiments, the predetermined threshold value condition may be a range of values (e.g., a range of integers, a percentage range, a numeric range, a qualitative range, etc.). In some embodiments, the predetermined threshold value condition may be satisfied if the first proximity value falls within the specified range. In other embodiments, the predetermined threshold value condition may be satisfied if the first proximity value falls outside of the specified range. In some embodiments, the predetermined threshold value condition may be satisfied if the first proximity value meets or exceeds the predetermined threshold value condition. In other embodiments, the predetermined threshold value condition may be satisfied if the first proximity value fails to meet or exceed the predetermined threshold value condition.

As an example, the system may generate for display the user input (e.g., flight information) and present the user input on a user interface of one or more display devices in response to the mobile device being nearby/in range (e.g., satisfying the predetermined value threshold condition) of one or more beacons and/or display devices. Additionally or alternatively, the system may generate for display information associated with the user input to be displayed on a user interface. For instance, the system may determine based on the user input, information to be displayed such that the information associated with the user input is relevant to a user. In a use case, such as an airport, the user may input (e.g., via the user input) flight information. The system may determine information associated with the user information based on the flight information (e.g., the user input) such as which flight the user is traveling on, the departing time of the flight, updates associated with the flight, and other information. The system may parse through the flight information and generate, for display, information associated with the user input to be displayed on the user interface such that the user may easily access important information that is relevant to the user without relying on their mobile device (e.g., to check on user specific information updates/information), thereby conserving the user's mobile device battery life.

Additionally or alternatively, the system may, in response to determining that the first proximity value fails to satisfy the predetermined threshold value condition, generate, for display, via the mobile device, an error message. For example, the error message may indicate to the user (e.g., the user of the mobile device), that the user is not within a proximate distance or range of one or more beacons and/or one or more display devices. In such case, the user may be alerted of such condition, and may change path/walk towards one or more beacons and/or display devices. In this way, the system may facilitate the reduction of clutter (e.g., visual clutter) on one or more display devices presenting another user's user specific information, thereby increasing user experience. For example, only users whose first proximity value satisfies the predetermined threshold value condition (e.g., within a proximate distance, location, or range of one or more beacons) may be capable of viewing their user specific information on a display device. This prevents users who are not nearby one or more beacons and/or display devices from being able to have their user specific information presented.

Additionally or alternatively, the system may identify, based on the data item, the environment the user is currently located. For example, the data item may be associated with an environment that the user is currently located. In a use case, the data item may be flight information. The system may determine, based on the flight information (e.g., the data item), that the user is currently located at an airport (e.g., the environment). The system may then determine, based on identifying the environment the user is currently located, the predetermined threshold value condition. In some embodiments, the predetermined threshold value condition may be a location range. For example, continuing with the use case (e.g., the user is currently located in an airport), the system may determine a location range for the predetermined threshold value condition. For example, since the user is likely to be in an airport, airport lounge, departure waiting room, and the alike, the system may determine the predetermined threshold value condition to be a predetermined location range. In some embodiments, the system may retrieve from a server (e.g., server 160 (FIG. 1)) and/or database (e.g., database 150) a predetermined threshold value condition based on the identified environment the user is currently located. As an example, server 160 and/or database 150 may include a set of predetermined threshold value conditions based on an environment the user is currently located. For instance, server 160 and/or database 150 may include a set of different location ranges for varying locations a user may be located. For instance, for a user located at an airport lounge, the location range may be set to 0 to 1 meters, 1 to 2 meters, 0 to 1 feet, 1 to 2 feet, and/or other location ranges (e.g., any range for measuring distance). In this way, the system may facilitate a reduction of processing resources (e.g., as compared to conventional system's reliance on GPS methods) to determine the proximate locations of mobile devices, thereby prolonging mobile device battery life.

Additionally or alternatively, the system may remove the user input from the user interface. For example, the system may determine, based on the data item, a timestamp. In some embodiments, the timestamp may indicate a time at which the user input is to be removed from the user interface. For example, in a use case, the data item may be appointment information (e.g., time of appointment, the doctor's name, or other information). The system may determine, based on the data item (e.g., appointment information), a timestamp at which the user input is to be removed from the user interface. For example, the system may determine that at the appointment time (e.g., the time at which the user is to see the doctor), the user input should be removed from the user interface. As another example, the system may determine that five minutes after the appointment time, the user input should be removed from the user interface. The system may then determine, via the mobile device, that the current time is the same time as the timestamp. For instance, the system may determine (e.g., by using one or more clocks, timekeeping devices, hardware, and/or software on mobile device 204 (FIG. 2)), that the current time (e.g., with respect to the mobile device 204 (FIG. 2)) is the same time as the timestamp. The system may then, in response to determining that the current time is the same time as the timestamp, remove the user input from the user interface. In this way, the system may reduce the amount of clutter on the user interface and/or display device, thereby increasing user experience by allowing other users to have easy access to their user specific information currently being displayed on the user interface and/or display device.

Additionally or alternatively, the system may receive, via the first SRWTLE beacon, a third signal. In some embodiments, the third signal may include a third signal value. For example, the third signal value may be measured power, location information, timestamp information, identifier information, or other information. The system may then determine a second proximity value based on the second signal value and the third signal value. In some embodiments, the second proximity value may indicate a second proximate distance between the mobile device (e.g., mobile device 204 (FIG. 2)) and the first SRWTLE beacon. In some embodiments, the second proximity value may be an integer, floating point value, decimal value, percentage, or other unit that may represent a distance in inches, feet, centimeters, meters, and the alike. In response to the second proximity value failing to satisfy the predetermined threshold value condition, the system may remove the user input from the user interface. For example, in a use case, where the user may be walking away from the first SRWTLE beacon and/or display device, the system may determine that the second proximity value may fail to satisfy the predetermined threshold value condition (e.g., because the user is walking away and is now out of range/not within a proximate distance of the beacon and/or display device). In this way, the system may reduce the amount of clutter on the user interface and/or display device, thereby increasing user experience by allowing other users to have easy access to their user specific information currently being displayed on the user interface and/or display device.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-4 could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for presenting user specific information based on mobile device proximity to short-range wireless technology beacons, the method comprising: receiving, via a first short-range wireless technology low energy (SRWTLE) beacon, a first signal comprising (i) a first signal value and (ii) a request for a user input; receiving, via a mobile device, a user input, wherein the user input comprises (i) a user identifier and (ii) a data item associated with an environment the user is currently located; receiving, via the first SRWTLE beacon, a second signal, wherein the second signal comprises a second signal value; determining a first proximity value based on the first signal value and the second signal value, wherein the first proximity value indicates a first proximate distance between the mobile device and the first SRWTLE beacon; and in response to the first proximity value satisfying a predetermined threshold value condition, generating for display, on a user interface, the user input.

2. The method of anyone of the preceding embodiments, wherein the first signal value is a first signal strength value and the second signal value is a second signal strength value; and wherein determining the first proximity value further comprises: determining, via the mobile device, a first received signal strength value and second received signal strength value based on the first signal strength value and the second signal strength value, respectively; determining, based on comparing the second received signal strength value to the first received signal strength value, that the second received signal strength value is greater than the first received signal strength value; selecting, based on determining that the second received signal strength value is greater than the first received signal strength value, the second received signal strength value; and in response to selecting the second received signal strength value, determining the first proximity value.

3. The method of any one of the preceding embodiments, wherein the first signal value is a first timestamp value and the second signal value is a second timestamp value; and wherein determining the first proximity value further comprises: determining, via the mobile device, a first arrival time of the first timestamp value and a second arrival time of the second timestamp value; determining (i) a first difference between the first arrival time and the first timestamp value and (ii) a second difference between the second arrival time and the second timestamp value; determining, based on comparing the first difference and the second difference, that the second difference is less than the first difference; selecting, based on determining that the second difference is less than the first difference, the second difference; and in response to selecting the second difference, determining the first proximity value based on the second difference.

4. The method of any one of the preceding embodiments, further comprising: receiving, via a second SRWTLE beacon, a third signal, wherein the third signal comprises a third signal value; receiving, via a third SRWTLE beacon, a fourth signal, wherein the fourth signal comprises a fourth signal value; determining, based on trilateration of the first signal, the third signal, and the fourth signal, a first proximate location of the mobile device; receiving, via the second SRWTLE beacon, a fifth signal, wherein the fifth signal comprises a fifth signal value; receiving, via the third SRWTLE beacon, a sixth signal, wherein the sixth signal comprises a sixth signal value; determining, based on trilateration of the second signal, the fifth signal, and the sixth signal value, a second proximate location of the mobile device; and determining, based on comparing the first proximate location to the second proximate location, the first proximity value.

5. The method of any one of the preceding embodiments, wherein each signal value of the first signal, the second signal, the third signal, the fourth signal, the fifth signal, and the sixth signal indicates a location of the corresponding SRWTLE beacon transmitting the respective signal and a timestamp value.

6. The method of any one of the preceding embodiments, further comprising: in response to determining that the first proximity value fails to satisfy the predetermined threshold value condition, generating, for display, via the mobile device, an error message.

7. The method of any one of the preceding embodiments, further comprising: determining, based on the user input, a proximate location of the mobile device; and determining, based on the proximate location of the mobile device, the first proximity value.

8. The method of any one of the preceding embodiments, further comprising: identifying, based on the data item, the environment the user is currently located; and determining, based on identifying the environment the user is currently located, the predetermined threshold value condition, wherein the predetermined threshold value condition is a location range.

9. The method of any one of the preceding embodiments, further comprising: determining, based on the data item, a timestamp, wherein the timestamp indicates a time at which the user input is to be removed from the user interface; determining, via the mobile device, that the current time is the same time as the timestamp; and in response to determining that the current time is the same time as the timestamp, removing the user input from the user interface.

10. The method of any one of the preceding embodiments, further comprising: receiving, via the first SRWTLE beacon, a third signal, wherein the third signal comprises a third signal value; determining a second proximity value based on the second signal value and the third signal value, wherein the second proximity value indicates a second proximate distance between the mobile device and the first SRWTLE beacon; and in response to the second proximity value failing to satisfy the predetermined threshold value condition, removing the user input from the user interface.

11. A tangible, non-transitory, machine-readable medium storing instructions that, when executed by a data processing apparatus, cause the data processing apparatus to perform operations comprising those of any of embodiments 1-10.

12. A system comprising: one or more processors; and memory storing instructions that, when executed by the processors, cause the processors to effectuate operations comprising those of any of embodiments 1-10.

13. A system comprising means for performing any of embodiments 1-10.

What is claimed is:

1. A system for presenting user specific information based on mobile device proximity to short-range wireless technology beacons, the system comprising:
    cloud-based storage circuitry configured to store:
        a user database, wherein the user database comprises a plurality of first user identifiers;
    cloud-based control circuitry configured to:
        in response to a mobile device of a user receiving, via a short-range wireless technology low energy (SRWTLE) beacon, a first signal comprising (i) a first signal strength value and (ii) a request for user specific information, receive the user specific information from the mobile device, wherein the user specific information comprises (i)_a second user identifier associated with the user and (ii) a data item associated with an environment the user is currently located;
        compare the second user identifier to each of the plurality of first user identifiers;
        select, based on comparing the second user identifier to each of the plurality of first user identifiers, the second user identifier;
        receive, via the SRWTLE beacon, a second signal, wherein the second signal comprises a second signal strength value;
    cloud-based input/output circuitry configured to generate for display, in response to a proximity value satisfying a predetermined threshold value condition, the user specific information comprising the selected second user identifier and the data item on a first portion of a user interface (i) separate from the mobile device and (ii) in the environment the user is currently located, wherein the proximity value is determined based on:
        comparing the second signal strength value to the first signal strength value to determine that the second signal strength value is greater than the first signal strength value;
        selecting the second signal strength value based on determining that the second signal strength value is greater than the first signal strength value; and
        determining the proximity value in response to selecting the second signal strength value.

2. A method for presenting user specific information based on mobile device proximity to short-range wireless technology beacons, the method comprising:
    in response to a mobile device of a user receiving, via a first short-range wireless technology low energy (SRWTLE) beacon, a first signal comprising (i) a first signal value and (ii) a request for a user input, receiving the user input from the mobile device, wherein the user input comprises (i) a user identifier associated with the user and (ii) a data item associated with an environment the user is currently located, and wherein the mobile device received the first signal;
    receiving, via the first SRWTLE beacon, a second signal, wherein the second signal comprises a second signal value; and
    in response to a first proximity value satisfying a predetermined threshold value condition, displaying the user input comprising the user identifier and the data item on a user interface (i) separate from the mobile device and (ii) in the environment the user is currently located, wherein the first proximity value is determined based on the first signal value and the second signal value, the first proximity value indicating a first proximate distance between the mobile device and the first SRWTLE beacon.

3. The method of claim 2, wherein the first signal value is a first signal strength value and the second signal value is a second signal strength value; and
    wherein determining the first proximity value further comprises:
        determining, via the mobile device, a first received signal strength value and a second received signal strength value based on the first signal strength value and the second signal strength value, respectively;
        determining, based on comparing the second received signal strength value to the first received signal strength value, that the second received signal strength value is greater than the first received signal strength value;
        selecting, based on determining that the second received signal strength value is greater than the first received signal strength value, the second received signal strength value; and
        in response to selecting the second received signal strength value, determining the first proximity value.

4. The method of claim 2, wherein the first signal value is a first timestamp value and the second signal value is a second timestamp value; and
    wherein determining the first proximity value further comprises:
        determining, via the mobile device, a first arrival time of the first timestamp value and a second arrival time of the second timestamp value;
        determining (i) a first difference between the first arrival time and the first timestamp value and (ii) a second difference between the second arrival time and the second timestamp value;
        determining, based on comparing the first difference and the second difference, that the second difference is less than the first difference;
        selecting, based on determining that the second difference is less than the first difference, the second difference; and in response to selecting the second difference, determining the first proximity value based on the second difference.

5. The method of claim 2, further comprising:
receiving, via a second SRWTLE beacon, a third signal, wherein the third signal comprises a third signal value;
receiving, via a third SRWTLE beacon, a fourth signal, wherein the fourth signal comprises a fourth signal value;
determining, based on trilateration of the first signal, the third signal, and the fourth signal, a first proximate location of the mobile device;
receiving, via the second SRWTLE beacon, a fifth signal, wherein the fifth signal comprises a fifth signal value;
receiving, via the third SRWTLE beacon, a sixth signal, wherein the sixth signal comprises a sixth signal value;
determining, based on trilateration of the second signal, the fifth signal, and the sixth signal value, a second proximate location of the mobile device; and
determining, based on comparing the first proximate location to the second proximate location, the first proximity value.

6. The method of claim 5, wherein each signal value of the first signal, the second signal, the third signal, the fourth signal, the fifth signal, and the sixth signal indicates a location of the corresponding SRWTLE beacon transmitting the respective signal and a timestamp value.

7. The method of claim 2, further comprising:
in response to determining that the first proximity value fails to satisfy the predetermined threshold value condition, generating, for display, via the mobile device, an error message.

8. The method of claim 2, further comprising:
determining, based on the user input, a proximate location of the mobile device; and
determining, based on the proximate location of the mobile device, the first proximity value.

9. The method of claim 2, further comprising:
identifying, based on the data item, the environment the user is currently located; and
determining, based on identifying the environment the user is currently located, the predetermined threshold value condition, wherein the predetermined threshold value condition is a location range.

10. The method of claim 2, further comprising:
determining, based on the data item, a timestamp, wherein the timestamp indicates a time at which the user input is to be removed from the user interface;
determining, via the mobile device, that the current time is the same time as the timestamp; and
in response to determining that the current time is the same time as the timestamp, removing the user input from the user interface.

11. The method of claim 2, further comprising:
receiving, via the first SRWTLE beacon, a third signal, wherein the third signal comprises a third signal value;
determining a second proximity value based on the second signal value and the third signal value, wherein the second proximity value indicates a second proximate distance between the mobile device and the first SRWTLE beacon; and
in response to the second proximity value failing to satisfy the predetermined threshold value condition, removing the user input from the user interface.

12. A non-transitory, computer-readable media for presenting user specific information based on mobile device proximity to short-range wireless technology beacons, comprising instructions that when executed by one or more processors, causes operations comprising:
in response to a mobile device of a user receiving, via a first short-range wireless technology low energy (SRWTLE) beacon, a first signal comprising (i) a first signal value and (ii) a request for a user input, receiving the user input from the mobile device, wherein the user input comprises (i) a user identifier associated with the user and (ii) a data item associated with an environment the user is currently located;
receiving, via the first SRWTLE beacon, a second signal, wherein the second signal comprises a second signal value; and
in response to a first proximity value satisfying a predetermined threshold value condition, displaying the user input comprising the user identifier and the data item on a user interface separate from the mobile device, wherein the first proximity value is determined based on the first signal value and the second signal value, the first proximity value indicating a first proximate distance between the mobile device and the first SRWTLE beacon.

13. The non-transitory, computer-readable media of claim 12, wherein the first signal value is a first signal strength value and the second signal value is a second signal strength value; and
wherein determining the first proximity value further comprises:
determining, via the mobile device, a first received signal strength value and a second received signal strength value based on the first signal strength value and the second signal strength value, respectively;
determining, based on comparing the second received signal strength value to the first received signal strength value, that the second received signal strength value is greater than the first received signal strength value;
selecting, based on determining that the second received signal strength value is greater than the first received signal strength value, the second received signal strength value; and
in response to selecting the second received signal strength value, determining the first proximity value.

14. The non-transitory, computer-readable media of claim 12, wherein the first signal value is a first timestamp value and the second signal value is a second timestamp value; and
wherein determining the first proximity value further comprises:
determining, via the mobile device, a first arrival time of the first timestamp value and a second arrival time of the second timestamp value;
determining (i) a first difference between the first arrival time and the first timestamp value and (ii) a second difference between the second arrival time and the second timestamp value;
determining, based on comparing the first difference and the second difference, that the second difference is less than the first difference;
selecting, based on determining that the second difference is less than the first difference, the second difference; and
in response to selecting the second difference, determining the first proximity value based on the second difference.

15. The non-transitory, computer-readable media of claim 12, wherein the instructions cause further operations comprising:
   receiving, via a second SRWTLE beacon, a third signal, wherein the third signal comprises a third signal value;
   receiving, via a third SRWTLE beacon, a fourth signal, wherein the fourth signal comprises a fourth signal value;
   determining, based on trilateration of the first signal, the third signal, and the fourth signal, a first proximate location of the mobile device;
   receiving, via the second SRWTLE beacon, a fifth signal, wherein the fifth signal comprises a fifth signal value;
   receiving, via the third SRWTLE beacon, a sixth signal, wherein the sixth signal comprises a sixth signal value;
   determining, based on trilateration of the second signal, the fifth signal, and the sixth signal value, a second proximate location of the mobile device; and
   determining, based on comparing the first proximate location to the second proximate location, the first proximity value.

16. The non-transitory, computer-readable media of claim 15, wherein each signal value of the first signal, the second signal, the third signal, the fourth signal, the fifth signal, and the sixth signal indicates a location of the corresponding SRWTLE beacon transmitting the respective signal and a timestamp value.

17. The non-transitory, computer-readable media of claim 12, wherein the instructions cause further operations comprising:
   in response to determining that the first proximity value fails to satisfy the predetermined threshold value condition, generating, for display, via the mobile device, an error message.

18. The non-transitory, computer-readable media of claim 12, wherein the instructions cause further operations comprising:
   determining, based on the user input, a proximate location of the mobile device; and
   determining, based on the proximate location of the mobile device, the first proximity value.

19. The non-transitory, computer-readable media of claim 12, wherein the instructions cause further operations comprising:
   determining, based on the data item, a timestamp, wherein the timestamp indicates a time at which the user input is to be removed from the user interface;
   determining, via the mobile device, that the current time is the same time as the timestamp; and
   in response to determining that the current time is the same time as the timestamp, removing the user input from the user interface.

20. The non-transitory, computer-readable media of claim 12, wherein the instructions cause further operations comprising:
   receiving, via the first SRWTLE beacon, a third signal, wherein the third signal comprises a third signal value;
   determining a second proximity value based on the second signal value and the third signal value, wherein the second proximity value indicates a second proximate distance between the mobile device and the first SRWTLE beacon; and
   in response to the second proximity value failing to satisfy the predetermined threshold value condition, removing the user input from the user interface.

* * * * *